United States Patent [19]

Sullivan, Jr. et al.

[11] 4,290,626
[45] Sep. 22, 1981

[54] DUAL FUNCTION STRUT BEARING

[75] Inventors: Leo S. Sullivan, Jr.; Richard A. Muzechuk, both of Dayton, Ohio

[73] Assignee: General Motors Corporation, Detroit, Mich.

[21] Appl. No.: 143,718

[22] Filed: Apr. 25, 1980

[51] Int. Cl.³ .............................................. B62D 17/00
[52] U.S. Cl. ..................... 280/692; 267/35; 280/710
[58] Field of Search ................ 267/35, 64; 280/690, 280/693, 696, 702, 709, 710, 692

[56] References Cited

U.S. PATENT DOCUMENTS

| 2,988,379 | 6/1961 | Walker | 280/710 |
| 3,333,654 | 8/1967 | Price-Stephens | 280/710 X |
| 3,482,829 | 12/1969 | Kidby | 267/35 |
| 4,111,456 | 9/1978 | Arnold et al. | 280/692 |

FOREIGN PATENT DOCUMENTS

| 2616258 | 3/1977 | Fed. Rep. of Germany | 267/35 |
| 2705690 | 8/1978 | Fed. Rep. of Germany | 280/710 |

Primary Examiner—Joseph F. Peters, Jr.
Assistant Examiner—Norman L. Stack, Jr.
Attorney, Agent, or Firm—Saul Schwartz

[57] ABSTRACT

An automotive strut type suspension system includes a pair of relatively telescopable members, one of which is attached to the vehicle sprung mass and the other of which is rotatable relative to the sprung mass, and a helical spring disposed around the relatively telescopable members. The spring is seated on the other telescopable member and bears at its opposite end against a retainer. A rigid bearing race is disposed on the sprung mass and includes race surfaces parallel to corresponding surfaces on the retainer. A dual function unitary bearing member is disposed between parallel surfaces on the bearing race and the retainer and accommodating relative rotation between the bearing race and the retainer the spring and the other telescopable member. The unitary bearing member is fabricated from plastic material which exhibits increased coefficient of friction with increased surface contact velocity so that rapid rotary oscillations between the bearing race and the retainer are effectively damped.

3 Claims, 2 Drawing Figures

U.S. Patent  Sep. 22, 1981  4,290,626
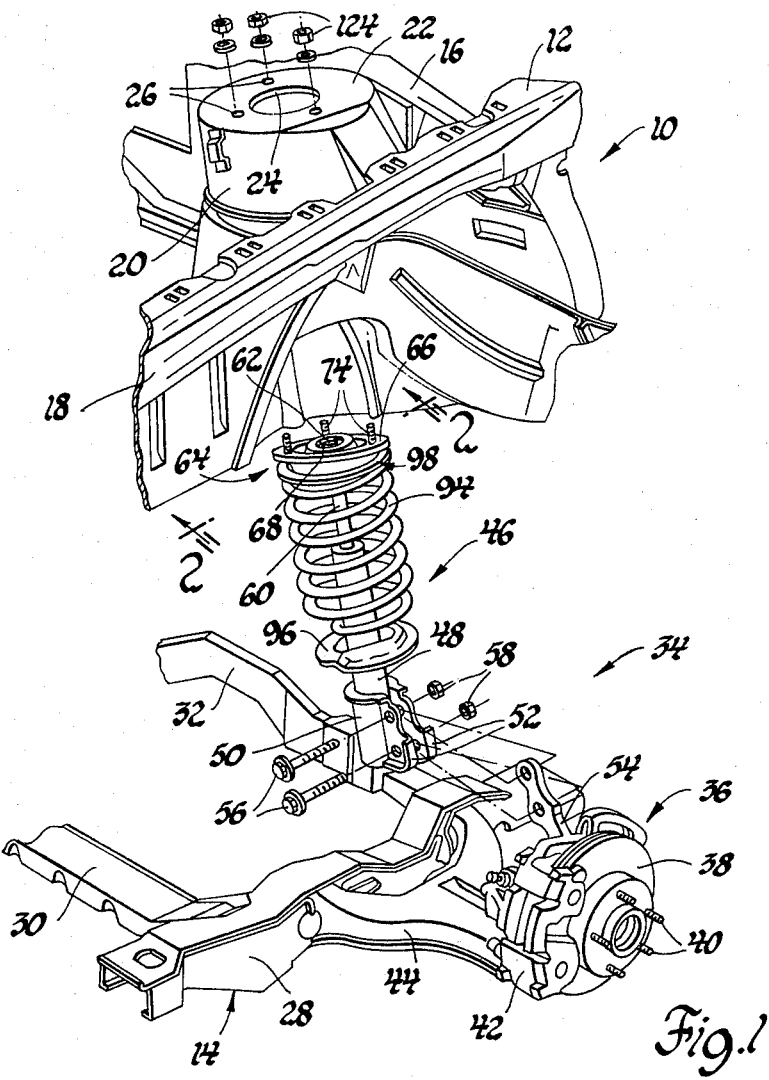
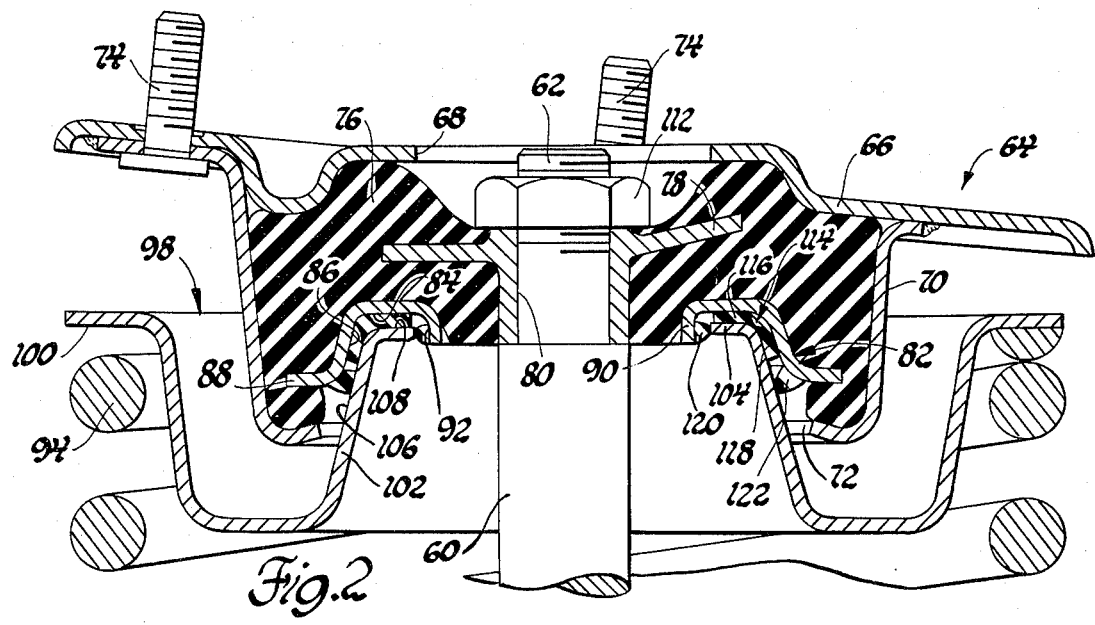

DUAL FUNCTION STRUT BEARING

BACKGROUND OF THE INVENTION

This invention relates generally to vehicle suspension systems and more particularly to an improved strut type suspension system for automobiles.

DESCRIPTION OF THE PRIOR ART

Typical automotive strut type suspension systems advantageously combine in a single unit both a wheel support member and a suspension shock absorber. The combined unit normally features a knuckle portion on which the road wheel is rotatably supported and a strut portion rigidly attached to the knuckle portion, the strut portion being in the form of a strut tube having a piston slidable inside and a piston rod attached to the piston and extending telescopically from the strut tube. The combined unit is disposed generally vertically with respect to the vehicle body with the lower end of the knuckle portion being constrained for movement in a path defined by a lower control arm and the outboard end of the piston rod being attached to the vehicle body. A spring disposed between the strut tube and the body functions to resiliently support the latter on the combined unit which, in turn, is supported relative to the pavement by the road wheel. Steering linkage is connected to the knuckle portion and rotates the combined unit relative to the vehicle body about a steering axis to effect steering movement of the wheel. Bearing means are provided between the vehicle body and the spring to permit relative movement and, in some instances, additional damping devices are disposed between the vehicle body and some part of the steering linkage to damp out rotary oscillation or shimmy of the combined unit about the steering axis. A strut type suspension system according to this invention incorporates improved means for accommodating relative motion between the spring and the vehicle body and for damping rotary oscillations.

SUMMARY OF THE INVENTION

The primary feature of this invention is that it provides an improved automotive strut type suspension system. Another feature of this invention resides in the provision in the improved suspension system of a dual function bearing which simultaneously functions as a bearing between relatively movable parts of the suspension system and as a rotary oscillation damper. Still another feature of this invention resides in the provision of a dual function bearing which is simple in design, economical to manufacture, and which includes no antifriction rolling elements and associated components. Yet another feature of this invention resides in the provision of a dual function bearing fabricated in a general cup shape configuration for disposition between correspondingly shaped bearing surfaces thereby to function both longitudinally and laterally, the dual function bearing being fabricated from a material which exhibits increasing coefficient of friction with increasing surface contact velocity so that rapid oscillation between the relatively movable members is damped.

These and other features of this invention will be readily apparent from the following specification and from the drawings wherein:

FIG. 1 is a fragmentary, partially expanded perspective view of an improved automobile strut type suspension system according to this invention; and FIG. 2 is an enlarged sectional view taken generally along the plane indicated in lines 2—2 in FIG. 1.

Referring now to FIG. 1 of the drawings, a vehicle body generally designated 10, which represents the sprung mass of the vehicle, includes a body portion 12 and a frame portion 14. The frame portion 14 is adapted for generally rigid attachment to the body portion 12 by conventional mounting means, not shown. The body portion 12 includes a transverse bulk head or firewall 16 and a longitudinally extending panel structure 18. The bulk head 16 and the panel structure 18, along with a similar panel structure on the opposite side of the vehicle, not shown, cooperate in defining an engine compartment at the front of the vehicle. The panel structure 18 includes a rigid spring tower 20 having a generally horizontal top 22. The top 22 has a centrally located access opening 24 and, for purposes described hereinafter, a plurality of mounting holes 26. It will be understood, of course, that the panel structure on the opposite side of the vehicle includes a spring tower generally identical to spring tower 20.

With continuing reference to FIG. 1, the frame portion 14 has a left longitudinally extending frame rail 28 and a corresponding right frame rail, not shown. The longitudinal frame rails are rigidly interconnected by a first cross member 30 and a second cross member 32. The frame portion provides a generally rigid platform on which the engine and other components, not shown, are mounted. At its front end, the vehicle body 10 is resiliently supported with respect to the pavement by a pair of generally identical strut type suspension systems according to the invention, only left front suspension system 34 being shown in FIG. 1.

Referring again to FIG. 1, the suspension 34 includes a steering knuckle portion 36 on which is rotatably supported a brake rotor 38 having rigid studs 40 projecting therefrom. A road wheel, not shown, is mounted on the brake rotor 38 by means of the studs 40 for conventional rotation about a wheel axis defined by the steering knuckle portion. A brake caliper assembly 42 is rigidly attached to the steering knuckle portion and functions in conventional manner to inhibit rotation of the rotor 38 to bring the vehicle to a stop. A lower control arm 44 is attached by conventional means to frame rail 28 for pivotal movement about a generally longitudinal axis of the vehicle and is connected to the lower end of the steering knuckle portion 36 by means of a conventional ball and socket type universal joint, not shown. The lower control arm 44 thus defines the path of movement of the lower end of steering knuckle portion 36, while at the same time, permitting pivotal movement of the knuckle about a steering axis to be described hereinafter.

As best seen in FIGS. 1 and 2, the suspension system 34 further includes a strut portion 46 adapted for disposition between the body portion 12 and the steering knuckle portion 36. The strut portion includes a strut tube 48 rigidly mounted in a base 50. The base 50 has integral spaced flanges 52 which, in the assembled condition, straddle a projection 54 on the steering knuckle portion 36. The flanges 52 are rigidly attached to the projection 54 by a pair of bolts 56 and corresponding nuts 58. The strut tube 48, accordingly, is a rigid extension of the steering knuckle portion 36 and moves as a unit therewith.

The strut portion 46 further includes a piston rod 60 which is slidably and sealingly disposed on the strut tube 48 for telescopic movement relative thereto. A piston, not shown, on the end of the piston rod 60 slides longitudinally within the strut tube in known manner and cooperates with hydraulic fluid within the strut tube in providing damping for vertical excursions of the steering knuckle portion 36. At its outboard or upper end, the piston rod 60 has a reduced diameter threaded section 62.

Referring now particularly to FIG. 2, a support assembly 64 includes a generally circular top plate 66 having a central aperture 68 and a bottom plate 70 of generally cup shaped configuration having a central aperture 72. The top and bottom plates 66 and 70 are joined together by conventional means, as by welding, and a plurality of threaded fasteners 74 project rigidly upward from the top plate 66. The interior space between the top and bottom plates 66 and 70 is partially filled with a resilient material 76, for example rubber, in which is firmly embedded a metal collar 78 having an axial bore 80. Also fixedly attached to the resilient material 76 is a generally cup shaped rigid bearing race 82 defining a generally horizontal bearing surface 84 and a frustoconical bearing surface 86. An outwardly extending flange 88 of the bearing race 82 projects into the resilient material 76 and an in-turned flange 90 of the bearing race 82 provides a short cylindrical surface 92.

Referring again to FIGS. 1 and 2, a helical coil spring 94 is disposed around the strut tube 48 and the piston rod 60 and seats at its lower end against a spring seat or abutment 96 rigidly attached to the strut tube 48. At its upper end, the spring 94 seats against a generally circular retainer 98. The retainer 98 is disposed below the support assembly 64 and includes a flange 100 on which the spring 94 seats, a frustoconical portion 102 and a generally horizontal portion 104. Frustoconical portion 102 has an outer surface 106 which is generally parallel to the frustoconical bearing surface 86 on the bearing race 82. Similarly, horizontal portion 104 has an upper surface 108 generally parallel to horizontal bearing surface 84 on the bearing race 82.

As best seen in FIG. 2, the support assembly 64 and the retainer 98 are disposed over the upper end of piston rod 60 with the spring 94 being captured between the retainer 98 and the abutment 96 and the threaded section 62 being received in the bore 80 of the collar 78. A nut 112 on the threaded section 62 of the piston rod restrains the support assembly 64 and the retainer 98 against the thrust of spring 94 which, of course, must be compressed prior to assembly. The piston rod is held on the assembly by the piston within the strut tube 48.

The spring 94 urges the retainer 98 toward engagement on the bearing race 82 but is maintained in separation from the latter by means of a dual function bearing 114. The dual function bearing 114 is generally cup shaped in configuration and includes a horizontal portion 116 and an integral frustoconical portion 118. The bearing 114 is disposed between the bearing race 82 and the spring retainer 98 such that horizontal portion 116 is disposed between surfaces 84 and 108 on the race 82 and retainer 98, respectively, and frustoconical portion 118 is disposed between surfaces 86 and 106 on the bearing race 82 and the spring retainer 98, respectively. Completing the assembly, an inner seal 120 and an outer seal 122 extend between the bearing race 82 and spring retainer 98 to restrict intrusion of soil and the like into the area around dual function bearing 114.

For a purpose more fully described hereinafter, the dual function bearing 114 is fabricated from a plastic material which exhibits a relatively low coefficient of friction in contact with a surface sliding at relatively low contact or relative velocity and which exhibits an increased coefficient of friction when in contact with the same surface sliding at a higher contact or relative velocity. It has been found that teflon (polytetrafluoroethylene) exhibits the desired characteristics and a dual function bearing fabricated from teflon and without further treatment provides satisfactory performance as described hereinafter. Satisfactory performance has also been found in a dual function bearing fabricated according to the procedure taught in U.S. Pat. No. 3,355,787, issued Dec. 5, 1967 in the name of Leo S. Sullivan, Jr. and assigned to the assignee of this invention. As taught by Sullivan, teflon is combined with acetal resin, molded into the desired shape, and then surface etched to expose teflon fibers. A dual function bearing thus fabricated will exhibit the desired variable coefficient of friction characteristic but will have a lower coefficient of friction during low contact velocities as compared to the first mentioned regular teflon bearing.

Referring again to FIGS. 1 and 2, the strut portion 46, after attachment to the steering knuckle portion 36, is disposed inside the spring tower 20 with the support assembly 64 abutting the underside of the spring tower top 22 and fasteners 74 projecting through the mounting holes 26. The support assembly 64 is retained on the spring tower by a plurality of nuts 124 threadedly received on respective ones of the fasteners 74. With the wheels of the vehicle resting on the pavement, the vehicle body 10 is resiliently supported on the combined unit made up of the steering knuckle portion and the strut portion by the coil spring 94 while the combined unit is rotatable about a steering axis defined generally by an axis passing through the midpoint of the connection between the piston rod threaded section 62 and the collar 78 and the center of the universal attachment, not shown, between the steering knuckle portion 36 and the lower control arm 44. The compressive or longitudinal forces exerted by the spring 94 are passed to the body portion 12 through the retainer 98, the horizontal portion 116 of the dual function bearing 114, the bearing race 82, the resilient material 76 and the top plate 66 of the support assembly 64. Lateral deflection of the retainer 98 relative to the support assembly 64 is resisted by the surface 86 on the bearing race 82 through the frustoconical portion 118 of the dual function bearing 114.

In response to steering input, the combined unit made up of the steering knuckle portion 36 and the strut portion 46 rotate about the steering axis relative to the body and the spring tower 20. The spring 94 rotates with strut portion 46. The retainer 98, rotating with the strut portion, will either slide relative to the dual function bearing 114 or rotate as a unit therewith causing the bearing to slide relative to the bearing race 82. The result in either case is the same, namely, low velocity sliding between a surface and the dual function bearing. Accordingly, at the low surface contact velocity the low coefficient of friction exhibited by the dual function bearing satisfactorily accommodates the relative rotary motion between the composite unit and the body portion 12. In addition, the capability of the dual function bearing to slide relative to either the retainer 98 or the bearing race 82 provides desirable redundancy to the system.

The bearing 114, while functioning to permit relative rotation, also functions as now described to damp rotary oscillations in the steering system. The oscillations referred to are generated under various vehicle operating conditions and tend to cause rapid rotary oscillation of the entire unsprung mass of the suspension system including the strut portion 46 and the steering knuckle portion 36 about the steering axis of the vehicle. These oscillations are typically very rapid and may be felt as vibration by the operator at the steering wheel. The dual function bearing 114, under normal, relatively slow, steering maneuvers, functions in a bearing mode as described hereinbefore.

However, with the onset of rapid oscillations of the strut portion 46 with the knuckle portion 36 about the steering axis, the surface contact velocity between the dual function bearing 114 and either the bearing race 82 or the retainer 98 increases. When this occurs there is a marked increase in coefficient of friction between the bearing race 82 and the bearing 114 due to the unique characteristics of the plastic material of the bearing which creates increased frictional drag. The increased frictional drag under these circumstances then has the beneficial effect of retarding or damping the oscillations. Dual function bearing 114, accordingly, combines in a single component the attributes of a conventional sliding bearing and a rotary damper.

The embodiments of the invention in which an exclusive property or privilege is claimed are defined as follows:

1. In a vehicle having a sprung mass, an unsprung mass, and a strut type suspension system including relatively telescopable members disposed between said sprung and said unsprung masses for relative telescopic movement along a unit axis defined by said members, and a helical spring disposed around said telescopable members, one of said telescopable members being attached to said sprung mass and the other of said telescopable members being rotatable relative to said sprung mass, the improvement comprising, means rigidly attaching one end of said spring to one of said sprung mass and said other of said relatively telescopable members, bearing race means on the other of said sprung mass and said other of said telescopable members defining a first bearing surface for resisting force components directed parallel to said unit axis and a second bearing surface for resisting force components directed at an angle to said unit axis, retainer means disposed between the other end of said spring and said race means and including a third bearing surface parallel to said first bearing surface and a fourth bearing surface parallel to said second bearing surface, a unitary bearing member disposed between said first and said third bearing surfaces and between said second and said fourth bearing surfaces so that said spring supports said sprung mass on said unsprung mass with said bearing members accommodating relative sliding motion between itself and one of said retainer means and said bearing race means thereby to permit rotation of said other of said telescopable members and said spring relative to said sprung mass, said unitary bearing member being fabricated from a material exhibiting increasing coefficient of friction with increasing surface contact velocity so that said unitary bearing member retards rapid relative rotary oscillation between said bearing race means and said retainer means about said unit axis.

2. In a vehicle having a sprung mass, an unsprung mass, and a strut type suspension system including relatively telescopable members disposed between said sprung and said unsprung masses for relative telescopic movement along a unit axis defined by said members, and a helical spring disposed around said telescopable members, one of said telescopable members being attached to said sprung mass and the other of said telescopable members being rotatable relative to said sprung mass, the improvement comprising, means rigidly attaching one end of said spring to said other of said relatively telescopable members, bearing race means disposed on said sprung mass defining a first bearing surface generally perpendicular to said unit axis for resisting force components directed parallel to said unit axis and a second bearing surface disposed frustoconically relative to said unit axis for resisting force components directed at an angle to said unit axis, retainer means disposed between the other end of said spring and said race means and including a third bearing surface parallel to said first bearing surface and a fourth bearing surface parallel to said second bearing surface, a unitary bearing member disposed between said first and said third bearing surfaces and between said second and said fourth bearing surfaces so that said spring supports said sprung mass on said unsprung mass with said bearing member accommodating relative sliding motion between itself and one of said retainer means and said bearing race means thereby to permit relative rotation between said bearing race means and said spring and said other of said telescopable members about said unit axis, said unitary bearing member being fabricated from a material exhibiting increasing coefficient of friction with increasing surface contact velocity so that said unitary bearing member retards rapid rotary oscillation of said retainer means relative to said bearing race means about said unit axis.

3. In a vehicle having a sprung mass, an unsprung mass, and a strut type suspension system including relatively telescopable members disposed between said sprung and said unsprung masses for relative telescopic movement along a unit axis defined by said members, and a helical spring disposed around said telescopable members, one of said telescopable members being attached to said sprung mass and the other of said telescopable members being rotatable relative to said sprung mass, the improvement comprising, means rigidly attaching one end of said spring to said other of said relatively telescopable members, a support member disposed on said sprung mass and having a resilient isolation portion and a rigid generally annular bearing race connected to said isolation portion, said bearing race having a first race surface generally perpendicular to said unit axis for resisting force components directed parallel to said unit axis and a second race surface disposed frustoconically relative to said unit axis for resisting force components directed at an angle to said unit axis, an annular spring retainer disposed between the other end of said spring and said bearing race and including a third race surface parallel to said first race surface and a fourth race surface parallel to said second race surface, and an annular unitary bearing member disposed between said first and said third race surfaces and between said second and said fourth race surfaces so that said spring supports said sprung mass on said unsprung mass with said bearing member accommodating relative sliding movement between itself and one of said bearing race and said spring retainer thereby to permit relative rotation between said bearing race and said spring and said other of said telescopable members about said unit axis, said unitary bearing member being fabricated from a plastic material including polytetrafluoroethylene so that said bearing member exhibits increasing coefficient of friction with increasing surface contact velocity thereby to retard rapid rotary oscillation of said retainer means relative to said bearing race about said unit axis.

* * * * *